(12) United States Patent
Bailey

(10) Patent No.: US 6,682,019 B2
(45) Date of Patent: Jan. 27, 2004

(54) MINIMUM ENERGY WHEEL CONFIGURATIONS FOR ENERGY STORAGE AND ATTITUDE CONTROL

(75) Inventor: David A. Bailey, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/116,605

(22) Filed: Apr. 4, 2002

(65) Prior Publication Data

US 2003/0189138 A1 Oct. 9, 2003

(51) Int. Cl.$^7$ ................................................ B64G 1/28
(52) U.S. Cl. ........................................ 244/164; 244/165
(58) Field of Search ................................. 244/164, 165

(56) References Cited

U.S. PATENT DOCUMENTS

| | | |
|---|---|---|
| 3,329,375 A | 7/1967 | Kurzhals et al. |
| 3,493,194 A | 2/1970 | Kurzhals |
| 4,723,735 A | 2/1988 | Eisenhaure et al. |
| 4,732,353 A | 3/1988 | Studer |
| 4,825,716 A | 5/1989 | Roberts et al. |
| 5,386,738 A | 2/1995 | Havenhill |
| 5,437,420 A | 8/1995 | Rosen |
| 5,611,505 A | 3/1997 | Smay |
| 5,692,707 A | 12/1997 | Smay |
| 5,875,676 A | 3/1999 | Bailey et al. |
| 6,039,290 A | 3/2000 | Wie et al. |
| 6,047,927 A * | 4/2000 | Heiberg et al. .............. 244/165 |
| 6,089,508 A * | 7/2000 | Noyola et al. ............... 244/165 |
| 6,128,556 A | 10/2000 | Bailey |
| 6,131,056 A * | 10/2000 | Bailey et al. .................. 701/13 |
| 6,135,392 A | 10/2000 | Wakugawa |
| 6,138,953 A * | 10/2000 | Noyola et al. ............... 244/165 |
| 6,154,691 A * | 11/2000 | Bailey .......................... 701/13 |
| 6,182,582 B1 | 2/2001 | Bailey et al. |
| 6,266,584 B1 * | 7/2001 | Hur-Diaz et al. .............. 701/13 |
| 6,305,647 B1 * | 10/2001 | Defendini et al. ........... 244/165 |
| 6,360,996 B1 * | 3/2002 | Bockman et al. ........... 244/165 |

FOREIGN PATENT DOCUMENTS

EP   0916576 A   5/1999

* cited by examiner

Primary Examiner—Charles T. Jordan
Assistant Examiner—Stephen Holzen

(57) ABSTRACT

A satellite energy and attitude control system includes a first energy wheel, a second energy wheel and a third energy wheel. The first energy wheel is mounted in a first double gimbal and the second energy wheel is mounted in a second double gimbal. The third energy wheel is mounted in a third double gimbal and the first, second and third energy wheels, which have at least two degrees of motion orthogonal to their respective spin axes, are located within a single plane and positioned with respect to each other such that the total angular momentum provided by the first, second and third energy wheels sums to zero approximate an operational range center of the gimbals.

20 Claims, 2 Drawing Sheets

MINIMUM ENERGY WHEEL CONFIGURATIONS FOR ENERGY STORAGE AND ATTITUDE CONTROL

BACKGROUND OF THE INVENTION

The present invention is generally directed to energy wheels and, more specifically, to minimum energy wheel configurations for energy storage and attitude control.

Today, most spacecraft that orbit the Earth contain attitude control, attitude reference and energy storage systems. In general, attitude control of the spacecraft has been accomplished by applying torques to the spacecraft through reaction wheel assemblies (RWAs) or control moment gyros (CMGs), while attitude reference has generally been provided by inertial sensors and devices that provide an absolute reference, such as sun and star sensors. Energy storage for the spacecraft has been performed by batteries that are charged by solar panels and energy wheels, which have performed both energy storage and attitude control.

In one known configuration 100 (FIG. 1), three pairs of energy wheels 102 & 104, 106 & 108, and 110 & 112 (FIG. 1) are implements within a spacecraft with each pair being located on a mutually orthogonal axis. In this configuration, attitude control is achieved by changing the speeds of each pair of the energy wheels 102 & 104, 106 & 108, and 110 & 112 (FIG. 1) in opposite directions. Such systems require six energy wheels 102 & 104, 106 & 108, and 110 & 112 (FIG. 1) (without redundancy) and when the wheels 102 & 104, 106 & 108, and 110 & 112 (FIG. 1) are storing energy, the speed of each pair is maintained at a constant difference. In order to provide redundancy, many designers have implemented a fourth pair of energy wheels. Another approach to the utilization of an energy wheel to provide both energy storage and attitude control of a spacecraft has been to double gimbal each of the energy wheels.

In another system, four energy wheels are combined in opposing pairs of which one pair of energy wheels is aligned orthogonally to the other pair of energy wheels.

However, while providing energy storage and attitude control, such a system does not provide redundancy. That is, if a single energy wheel is lost the other wheel in the pair must be shut down to produce an unbiased angular momentum in the spacecraft. In this configuration, the remaining pair of energy wheels produce zero net angular momentum, with both sets of gimbals in their null position. However, such a system has a singularity in the attitude control portion of the system at zero angular momentum. Further, there is no combination of gimbal rates that produces torque about the spin axis of the functioning pair of energy wheels.

What is needed is a minimum energy wheel configuration that can perform attitude control without singularities in the angular momentum from the gimbal angle Jacobian matrix at zero angular momentum.

SUMMARY OF THE INVENTION

The present invention is generally directed to a satellite energy and attitude control system that includes a first energy wheel, a second energy wheel and a third energy wheel. The first energy wheel is mounted in a first double gimbal and the second energy wheel is mounted in a second double gimbal. The third energy wheel is mounted in a third double gimbal and the first, second and third energy wheels, which have at least two degrees of motion orthogonal to their respective spin axes, are located within a single plane and positioned with respect to each other such that the total angular momentum provided by the first, second and third energy wheels sums to zero approximate an operational range center of the gimbals. According to another embodiment of the present invention, a fourth energy wheel is provided that is mounted in a fourth double gimbal and is located within the single plane. The fourth energy wheel is positioned with respect to the first, second and third energy wheels such that the total angular momentum provided by the first, second, third and fourth energy wheels sum to zero approximate an operational range of the gimbals.

These and other features, advantages and objects of the present invention will be further understood and appreciated by those skilled in the art by reference to the following specification, claims and appended drawings.

DETAILED DESCRIPTION OF THE PREFERRED EMBODIMENT(S)

In general, the angular momentum generated by a set of energy wheels is greater than what is needed for satellite attitude control. For example, a spacecraft, e.g., a satellite, with a maximum power requirement of 2000 watts and a safe mode power requirement of 400 watts is required to store enough power such that 400 watts can be delivered for 24 hours. That is, the set of energy wheels must be capable of providing 9600 watt-hours (or 29,490,000 foot-pounds) of energy. In addition, the satellite may require 100 foot-pound-seconds of angular momentum and 5 foot-pounds of torque for its attitude control system. A satellite whose set of energy wheels can provide a total energy of 29,260,566 foot-pounds can be achieved with an energy wheel set having the following characteristics: a maximum speed of 40,000 RPMs, a turndown speed of one-third of the maximum speed and an energy conversion efficiency of 98 percent. In a typical case, the total momentum of inertia of the wheels may be about 3.3353 foot-pounds-seconds$^2$ and the total angular momentum may be about 13,970 foot-pound-seconds.

However, if attitude control is to be accomplished simply by changing the speeds of the energy wheels, then the power required to provide 5 foot pounds of torque is about 28,396 Watts, which is about 14 times the power available from one of the energy wheels. Thus, if both attitude control and power are to be accomplished with the same energy wheels, it is generally necessary to gimbal the wheels to provide appropriate torques to the satellite. For example, if 100 foot-pound-seconds of angular momentum transferred to the satellite gives the satellite an angular rate of 1 degree per second, then the total energy transferred to the satellite is 1.18 Joules over a 20 second period. Assuming a 10 percent efficient gimbal drive, the power required to perform such an operation would be under about 0.6 Watts.

According to the present invention, attitude control using energy wheels is achieved by suspending the energy wheels in a set of double gimbals using a high effective gear ratio with low back drive torques. In this manner, the energy wheels can all be driven at a constant ratio of speeds over their operating range. Thus, according to the present invention, both a non-redundant and a singular redundant minimum energy wheel configuration can be achieved. The configurations can perform attitude control without singularities in the angular momentum from the gimbal angle Jacobian matrix at zero angular momentum.

Figure 1:
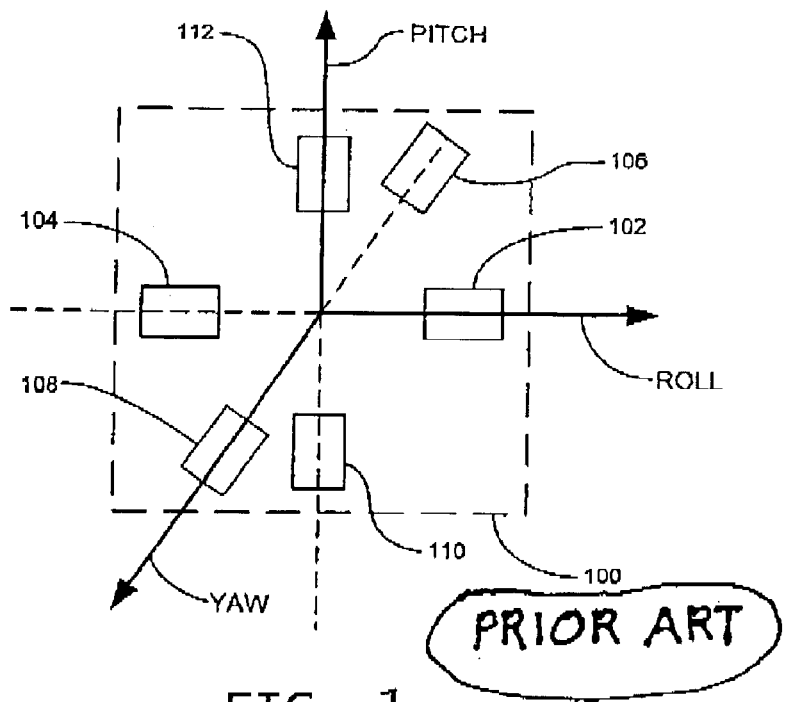
FIG. 1 is a diagram of an exemplary spacecraft including a pair of energy wheels mounted on each of three orthogonal axes.
Figure 2:
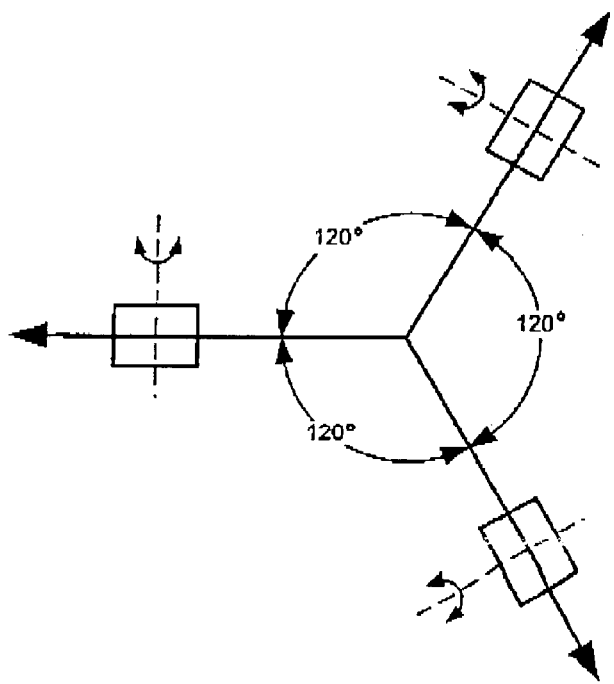
FIG. 2 is an angular momentum diagram of three energy wheels mounted in a plane such that the angular momentum vectors of the three energy wheels are rotated every one-hundred twenty degrees.

The minimum number of energy wheels with no control singularity at zero angular momentum is three in a plane with the angular momentum vectors rotated every one-hundred twenty degrees, as is shown in FIG. 2. In this case, the total angle that the angular momentum vector needs to rotate, with minimum energy in the energy wheels, is about 3.755 degrees. The gimbal rate required to achieve the desired angular momentum is about 0.19 degrees per second, which can be accomplished with a wedge of about 8 degrees. In this minimum energy wheel configuration, unbiased three axis control of the satellite can be achieved. In this configuration, the total angular momentum of the three energy wheels sums to zero at or near the center of the operational gimbal range and each of the energy wheels are configured such that they have about 2 degrees of motion orthogonal to the spin axis for attitude control.

Figure 3:
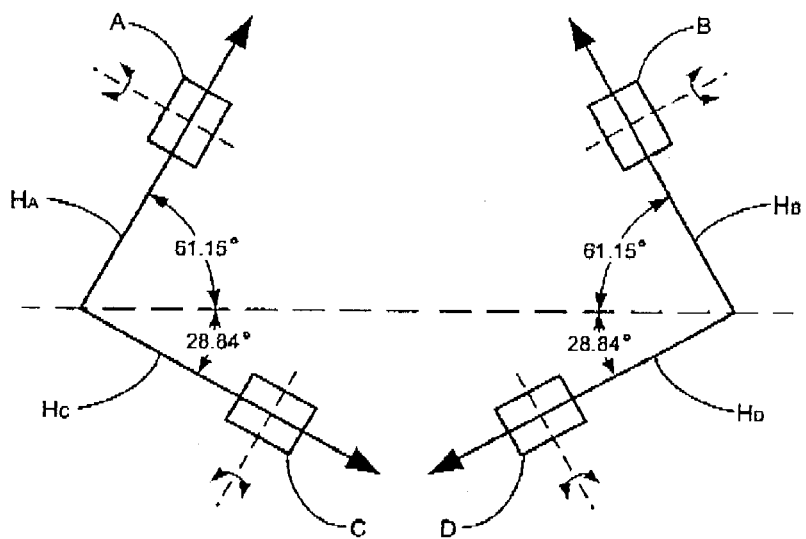
FIG. 3 is an angular momentum diagram of a planar energy wheel array that includes four energy wheels, one of which is included for redundancy.

FIG. 3 depicts an angular momentum diagram of a minimum energy wheel configuration that includes four wheels, where one of the wheels is added for redundancy. Thus, should one of the energy wheels fail, the mission can still be accomplished. When all of the energy wheels are functional, they may be ran at an A:B:C:D speed ratio of about 0.5508:0.5508:1.000:1.000 for the wheels A, B, C and D, respectively, while providing a net angular momentum of zero. This provides the system with about 2.607 times the maximum energy storage of a single wheel, assuming that the energy wheels can extract energy over a 4:1 speed range and that a 2:1 speed range is used for any configuration.

Figure 4:
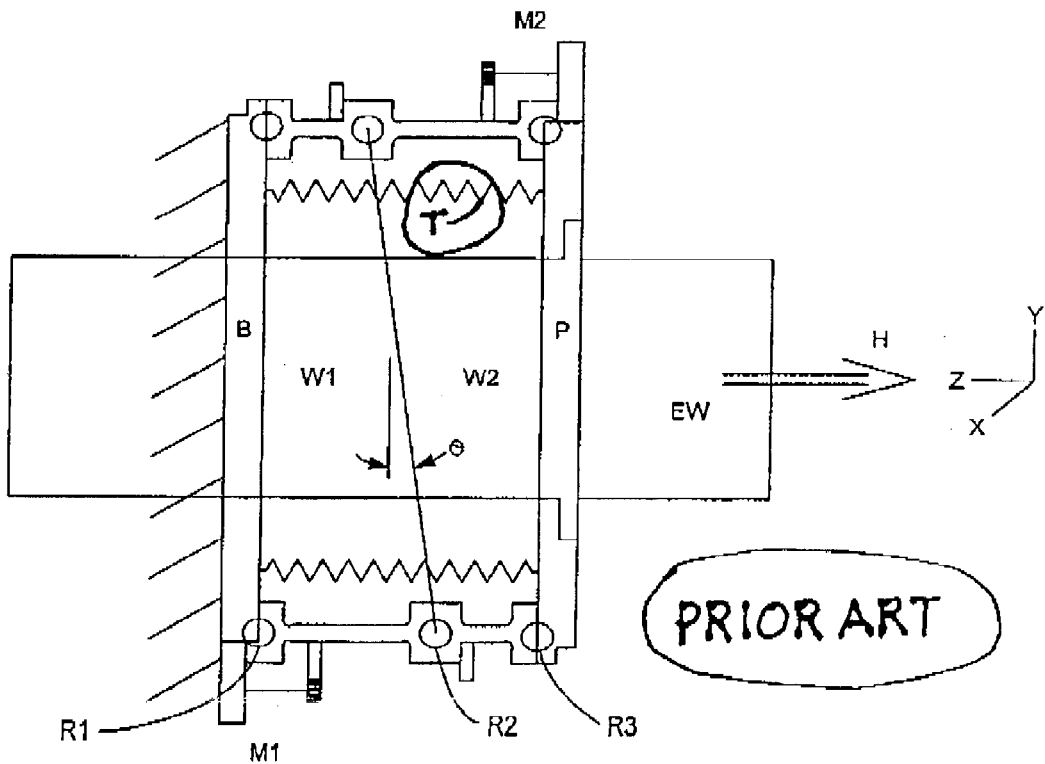
FIG. 4 is a drawing of an energy wheel mounting platform that includes two wedged shaped platforms that are each rotatable about a different axis and are rotationally mounted together such that an associated energy wheel can be tilted about two axes that are orthogonal to the spin axis of the energy wheel.

The angular momentum of each of the wheels can be transferred to the satellite via a double gimbal arrangement, such as that shown in FIG. 4. If either the A or B energy wheels are turned off, the solution to the speeds are the same, but inverted left to right. For example, if the A energy wheel is turned off, the speed ratios B:C:D of the remaining wheels may be set to about 0.8452:1.000:0.5345 for the energy wheels B, C and D, respectively. The total energy available out of the array is about two times the energy of a single energy wheel and the angular momentum provided by the array may be transferred to the satellite through a double gimbal while maintaining a total angular momentum of zero. Assuming the energy wheel C is not operating, the speed of the remaining energy wheels may be changed as follows: 1.000:−0.5345:0.8452 for the wheels A, B, and D, respectively. The total energy of the system is still about two times the energy stored in the single wheel and the total angular momentum for the array is still zero.

It should be understood that operationally the energy wheels need to be able to spin in either direction and when a configuration is changed the angular momentum needs to be absorbed by a reaction and station keeping control system. Thus, as is shown in FIG. 3, the angular momentum of four doubled gimbaled energy wheels are arranged in a plane such that the sum of the angular momentum is zero or near zero in the center of the gimbal range. As can be seen in FIG. 3, none of the spin axes of the energy wheels are colinear. Further, as is discussed above, if any single wheel is turned off, the angular momentum of the remaining functional energy wheels can be made to sum to zero at or near the center of the gimbal operational range, without the angular momentum from gimbal angle Jacobian becoming singular near the zero angular momentum gimbal angle set.

FIG. 4 depicts a drawing of a double gimbal arrangement that can be utilized to effect movement of an energy wheel about two orthogonal axes. A suitable tilt table is further described in U.S. Pat. No. 6,182,582 to Bailey et al., the disclosure of which is hereby incorporated herein by reference in its entirety. Briefly, a base 'B' is connected to the energy wheel 'EW' and to a mounting platform 'P' by two small angle actuating wedges 'W1' and 'W2' (e.g., eight degree wedges) and is restrained in all but the axial Z angular direction by three sets of bearings 'R1', 'R2' and 'R3', and is further restrained in the axial angular direction by an axially angularly stiff, but otherwise compliant member 'T' (e.g., metal bellows and machine springs).

The wedges 'W1' and 'W2' are rotated individually or in concert by motors 'M1' and 'M2' to orient the momentum vector 'H' of the energy wheel 'EW' through a total angle +/−θ about the X and Y axes. The motor 'M2' can alternatively be mounted on the wedge 'W2', although management of wiring across the rotating interface requires somewhat greater complexity, but with fewer constraints in the tortional stiffness of the element 'T'.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A satellite energy and attitude control system, comprising:
   a first energy wheel configured to rotate at a first speed mounted in a first double gimbal;
   a second energy wheel configured to rotate at a second speed mounted in a second double gimbal;
   a third energy wheel configured to rotate at a third speed mounted in a third double gimbal, wherein the first, second, and third wheel speeds are controllable to vary in concert to maintain constant wheel speed ratios, wherein the first, second, and third energy wheels are located within a single plane and positioned with respect to each other such that the total angular momentum provided by the first, second, and third energy wheels sum to zero approximate an operational range center of the gimbals, and wherein the first, second, and third energy wheels have at least two degrees of motion orthogonal to their respective spin axes.

2. The system of claim 1, wherein the spin axes of the first, second, and third energy wheels are not collinear.

3. The system of claim 1, wherein the system performs attitude control without singularities in angular momentum from gimbal angle Jacobian matrix at zero angular momentum.

4. The system of claim 1, further including:

a fourth energy wheel mounted in a fourth double gimbal and located within the single plane, wherein the fourth energy wheel is positioned with respect to the first, second, and third energy wheels such that the total angular momentum provided by the first, second, and third energy wheels sum to zero approximate an operational range center of the gimbals, further wherein:

the second energy wheel is configured to rotate at a first speed:

the third energy wheel is configured to rotate at a fourth speed; and the fourth energy wheel is configured to rotate at a fourth speed; wherein said first and fourth wheel speeds are controllable to vary in concert to maintain constant wheel speed ratios.

5. The system of claim 4, wherein speed ratios are set at about 0.5508:0.5508:1.0000:1.0000 for first, second, third and fourth energy wheels.

6. The system of claim 5, wherein if the first energy wheel is turned off the speed ratios of the remaining active wheels are set at about 0.8452:1.0000:0.5345 for the second, third and fourth energy wheels.

7. The system of claim 5, wherein if the third energy wheel is turned off the speed ratios of the remaining active wheels are set at about 1.0000:−0.5345: 0.8452 for the first, second and fourth energy wheels.

8. The system of claim 4, wherein if any one of the energy wheels are turned off the speed of the remaining energy wheels are adjustable such that the total angular momentum provided by the remaining energy wheels sums to zero at an operational range center of the gimbals.

9. The system of claim 4, wherein the spin axes of the first, second, third and fourth energy wheels are not collinear.

10. The system of claim 4, wherein the first, second, third and fourth energy wheels can be spun both clockwise and counter-clockwise with respect to the spin axes of the respective wheels.

11. A satellite energy and attitude control system, comprising:

a first energy wheel configured to rotate at a first speed mounted in a first double gimbal;

a second energy wheel configured to rotate at a first speed mounted in a second double gimbal;

a third energy wheel configured to rotate at a fourth speed mounted in a third double gimbal; and a fourth energy wheel configured to rotate at a fourth speed mounted in a fourth double gimbal, wherein the first and fourth wheel speeds are controllable to vary in concert to maintain constant wheel speed ratios, wherein the first, second, third, and fourth energy wheels are located within a single plane and positioned with respect to each other such that the total angular momentum provided by the first, second, third, and fourth energy wheels sum to zero approximate an operational range center of the gimbals, and wherein the first, second, third, and fourth energy wheels have at least two degrees of motion orthogonal to their respective spin axes.

12. The system of claim 11, wherein the spin axes of the first, second, third, and fourth energy wheels are not collinear.

13. The system of claim 11, wherein the system performs attitude control without singularities in angular momentum from gimbal angle Jacobian matrix at zero angular momentum.

14. The system of claim 11, wherein speed ratios are set at about 0.5508:0.5508:1.0000:1.0000 for first, second, third, and fourth energy wheels.

15. The system of claim 14, wherein if the first energy wheel is turned off the speed ratios of the remaining active wheels are set to about 0.8452:1.0000:0.5345 for the second, third, and fourth energy wheels.

16. The system of claim 14, wherein if the third energy wheel is turned off the speed ratios of the remaining active wheels are set to about 1.0000:0.5345:0.8452 for the first, second, and fourth energy wheels.

17. The system of claim 11, wherein if any one of the energy wheels are turned off the speed of the remaining energy wheels are adjustable such that the total angular momentum provided by the remaining energy wheels sums to zero at an operational center of the gimbals.

18. The system of claim 11, wherein the first, second, third and fourth energy wheels can be spun both clockwise and counter-clockwise with respect to the spin axes of the respective wheels.

19. A satellite energy and attitude control system, comprising:

a first energy wheel configured to rotate at a first speed mounted in a first double gimbal;

a second energy wheel configured to rotate at a second speed mounted in a second double gimbal;

a third energy wheel configured to rotate at a third speed mounted in a third double gimbal, wherein the first, second and third wheel speeds are controllable to vary in concert to maintain constant wheel speed ratios, wherein the first, second, and third energy wheels are located within a single plane and positioned with respect to each other such that the total angular momentum provided by the first, second, and third energy wheels sum to zero approximate an operational range center of the gimbals, and wherein the first, second, and third energy wheels have at least two degrees of motion orthogonal to their respective spin axes, where the spin axes of the first, second and third energy wheels are not collinear, and where the system performs attitude control without singularities in angular momentum from gimbal angle Jacobian matrix at zero angular momentum.

20. The system of claim 19, further including:

a fourth energy wheel mounted in a fourth double gimbal and located within the single plane, wherein the fourth energy wheel is positioned with respect to the first, second, third and fourth energy wheels sum to zero approximate an operational range center of the gimbals.

* * * * *